US011341626B2

(12) United States Patent
Wen et al.

(10) Patent No.: US 11,341,626 B2
(45) Date of Patent: May 24, 2022

(54) METHOD AND APPARATUS FOR OUTPUTTING INFORMATION

(71) Applicant: Beijing Baidu Netcom Science and Technology Co., Ltd., Beijing (CN)

(72) Inventors: Yawei Wen, Beijing (CN); Jiabing Leng, Beijing (CN); Chengcheng Wang, Beijing (CN); Ye Su, Beijing (CN); Minghao Liu, Beijing (CN); Yulin Xu, Beijing (CN); Jiangliang Guo, Beijing (CN); Xu Li, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 156 days.

(21) Appl. No.: 16/665,857

(22) Filed: Oct. 28, 2019

(65) Prior Publication Data

US 2020/0294222 A1   Sep. 17, 2020

(30) Foreign Application Priority Data

Mar. 12, 2019   (CN) .......................... 201910184208.6

(51) Int. Cl.
  *G06T 7/00*    (2017.01)
  *G06T 7/11*    (2017.01)
  *G06K 9/62*    (2022.01)

(52) U.S. Cl.
  CPC .......... *G06T 7/0004* (2013.01); *G06K 9/6256* (2013.01); *G06K 9/6268* (2013.01); *G06T 7/11* (2017.01); *G06T 2207/20021* (2013.01); *G06T 2207/20081* (2013.01); *G06T 2207/20084* (2013.01); *G06T 2207/30161* (2013.01)

(58) Field of Classification Search
CPC ............ G06K 2209/19; G06K 9/6256; G06K 9/6268; G06K 9/6273; G06T 2207/20021; G06T 2207/20081; G06T 2207/20084; G06T 2207/30161; G06T 7/0004; G06T 7/11

See application file for complete search history.

(56) References Cited

U.S. PATENT DOCUMENTS

| 6,622,135 B1 * | 9/2003 | Imbert De Tremiolles ................. G06T 7/0004 706/20 |
| 10,129,456 B1 * | 11/2018 | Kim .................... H04N 5/23212 |
| 2007/0076195 A1 * | 4/2007 | Yamaguchi .......... G01N 21/956 356/237.1 |

(Continued)

FOREIGN PATENT DOCUMENTS

| CN | 103761743 A | 4/2014 |
| CN | 107392896 A | 11/2017 |

(Continued)

*Primary Examiner* — Bobbak Safaipour
(74) *Attorney, Agent, or Firm* — Kilpatrick Townsend & Stockton LLP

(57) ABSTRACT

Embodiments of the present disclosure relate to a method and apparatus for outputting information. The method can include: acquiring an image of a to-be-inspected object; segmenting the image into at least one subimage; for a subimage in the at least one subimage, inputting the subimage into a pre-trained defect classification model to obtain a defect category corresponding to the subimage; and outputting defect information of the object based on a defect category corresponding to each subimage.

19 Claims, 5 Drawing Sheets

(56) References Cited

U.S. PATENT DOCUMENTS

| | | | |
|---|---|---|---|
| 2013/0146763 A1* | 6/2013 | Kawada | G01B 15/00 |
| | | | 382/217 |
| 2013/0236086 A1* | 9/2013 | Chen | G06T 7/0006 |
| | | | 382/149 |
| 2013/0257910 A1* | 10/2013 | Park | G06K 9/00 |
| | | | 382/128 |
| 2015/0109474 A1* | 4/2015 | Saruta | G06V 20/10 |
| | | | 348/222.1 |
| 2018/0268538 A1 | 9/2018 | Reunanen | |
| 2019/0252213 A1* | 8/2019 | Koizumi | C25D 17/001 |
| 2019/0362490 A1* | 11/2019 | Wen | G06N 3/0454 |
| 2019/0368133 A1* | 12/2019 | Joshi | G06N 20/00 |
| 2020/0334446 A1* | 10/2020 | Fang | G01R 31/307 |
| 2020/0364850 A1* | 11/2020 | Tsai | G06V 10/25 |
| 2021/0231586 A1* | 7/2021 | Sugata | G01N 21/956 |

FOREIGN PATENT DOCUMENTS

| | | |
|---|---|---|
| CN | 108460761 A | 8/2018 |
| CN | 109085179 A | 12/2018 |

* cited by examiner

METHOD AND APPARATUS FOR OUTPUTTING INFORMATION

CROSS-REFERENCE TO RELATED APPLICATIONS

This application claims priority to Chinese Patent Application No. 201910184208.6, filed with the China National Intellectual Property Administration (CNIPA) on Mar. 12, 2019, the contents of which are incorporated herein by reference in its entirety.

TECHNICAL FIELD

Embodiments of the present disclosure relate to the field of computer technology, and in particular to, a method and apparatus for outputting information.

BACKGROUND

Existing process of surface quality inspection on products (particularly wooden objects) produced on production line mainly relies on completely manual inspection or an inspection system based on feature engineering. In the case of manual quality inspection, the products need to be inspected by staff with their naked eyes. However, such a method is inefficient, missed and false judgment tends to be caused, and the data is difficult to be re-utilized and mined. The generation environment of the products in a production workshop are relatively poor, compared with an office environment, and accordingly the manual quality inspection will adversely affect the health and safety of the staff. Alternatively, computer aided inspection systems based on the feature engineering are used, but such systems have a low accuracy and poor performance. In a quality inspection system based on a traditional expert system or the feature engineering, both features and judgment rules are integrated into a machine based on experience, and are hard to be iterated with the development of business, such that with the production technology development and the raw material change, the inspection precision of the system is increasingly low, or even too low to reach a completely unusable state. In addition, features of the traditional quality inspection system are pre-integrated in hardware by a third-party supplier. The upgrading of the traditional quality inspection system not only needs major transformation of the production line, but also is expensive. The traditional quality inspection system has obvious defects in terms of the safety, standardization, scalability, and the like, and is not conducive to the optimization and upgrading of the production line.

SUMMARY

Embodiments of the present disclosure present a method and apparatus for outputting information.

In a first aspect, an embodiment of the present disclosure provides a method for outputting information, including: acquiring an image of a to-be-inspected object; segmenting the image into at least one subimage; for a subimage in the at least one subimage, inputting the subimage into a pre-trained defect classification model to obtain a defect category corresponding to the subimage; and outputting defect information of the object based on a defect category corresponding to each subimage.

In some embodiments, the acquiring an image of a to-be-inspected object includes: acquiring at least one image of the to-be-inspected object based on at least one of following parameters of a camera: angle, light, filter, lens, or focus.

In some embodiments, the segmenting the image into at least one subimage includes: segmenting the image into at least one subimage in accordance with a preset segmenting position, and determining a position of each subimage.

In some embodiments, the outputting defect information of the object based on a defect category corresponding to each subimage includes: outputting a position and a category of a defect of the object based on the defect category corresponding to each subimage and the position of each subimage.

In some embodiments, the object is a wooden object, and the defect category includes at least one of: a wormhole, a crack, a notch, or a scab.

In some embodiments, the defect classification model is obtained by following training: acquiring a training sample set, a training sample including a sample image of an object and a defect category corresponding to the sample image; and obtaining the defect classification model through training, with the sample image of the training sample in the training sample set as an input and the defect category corresponding to the inputted sample image as an output.

In some embodiments, the defect classification model adopts a deep convolutional neural network, including: a convolutional layer, a pooling layer, and a fully connected layer.

In a second aspect, an embodiment of the present disclosure provides an apparatus for outputting information, including: an acquiring unit, configured to acquire an image of a to-be-inspected object; a segmenting unit, configured to segment the image into at least one subimage; an inspecting unit, configured to input, for a subimage in the at least one subimage, the subimage into a pre-trained defect classification model to obtain a defect category corresponding to the subimage; and an outputting unit, configured to output defect information of the object based on a defect category corresponding to each subimage.

In some embodiments, the acquiring unit is further configured to: acquire at least one image of the to-be-inspected object based on at least one of following parameters of a camera: angle, light, filter, lens, or focus.

In some embodiments, the segmenting unit is further configured to: segment the image into at least one subimage in accordance with a preset segmenting position, and determine a position of each subimage.

In some embodiments, the outputting unit is further configured to: output a position and a category of a defect of the object based on the defect category corresponding to the each subimage and the position of the each subimage.

In some embodiments, the object is a wooden object, and the defect category includes at least one of following items: a wormhole, a crack, a notch, or a scab.

In some embodiments, the apparatus further includes a training unit configured to: acquire a training sample set, a training sample including a sample image of an object and a defect category corresponding to the sample image; and obtain the defect classification model through training, with the sample image of the training sample in the training sample set as an input and the defect category corresponding to the inputted sample image as an output.

In some embodiments, the defect classification model adopts a deep convolutional neural network, including: a convolutional layer, a pooling layer, and a fully connected layer.

In a third aspect, an embodiment of the present disclosure provides an electronic device, including: one or more processors; and a storage apparatus, storing one or more programs thereon, where the one or more programs, when executed by the one or more processors, cause the one or more processors to implement the method according to any one implementation in the first aspect.

In a fourth aspect, an embodiment of the present disclosure provides a computer readable medium, storing a computer program thereon, where the program, when executed by a processor, implements the method according to any one implementation in the first aspect.

The method and apparatus for outputting information provided in some embodiments of the present disclosure detect and determine surface quality of products in real time based on images captured in real time using an image capturing device on a production line. If that a product currently passing through the image capturing device has a quality problem is inspected, then a category of the quality problem is determined, thereby improving the efficiency and accuracy of surface quality inspection of the object, and contributing to the statistical of defect information, thus facilitating subsequent quality management and control.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

Embodiments of present disclosure will be further described below in detail in combination with the accompanying drawings. It should be understood that the specific embodiments described herein are merely used for explaining the relevant disclosure, rather than limiting the disclosure. In addition, it should be further noted that, for the ease of description, only the parts related to the relevant disclosure are shown in the accompanying drawings.

It should be noted that some embodiments in the present disclosure and some features in the embodiments may be combined with each other on a non-conflict basis. Features of the present disclosure will be described below in detail with reference to the accompanying drawings and in combination with embodiments.

Figure 1:
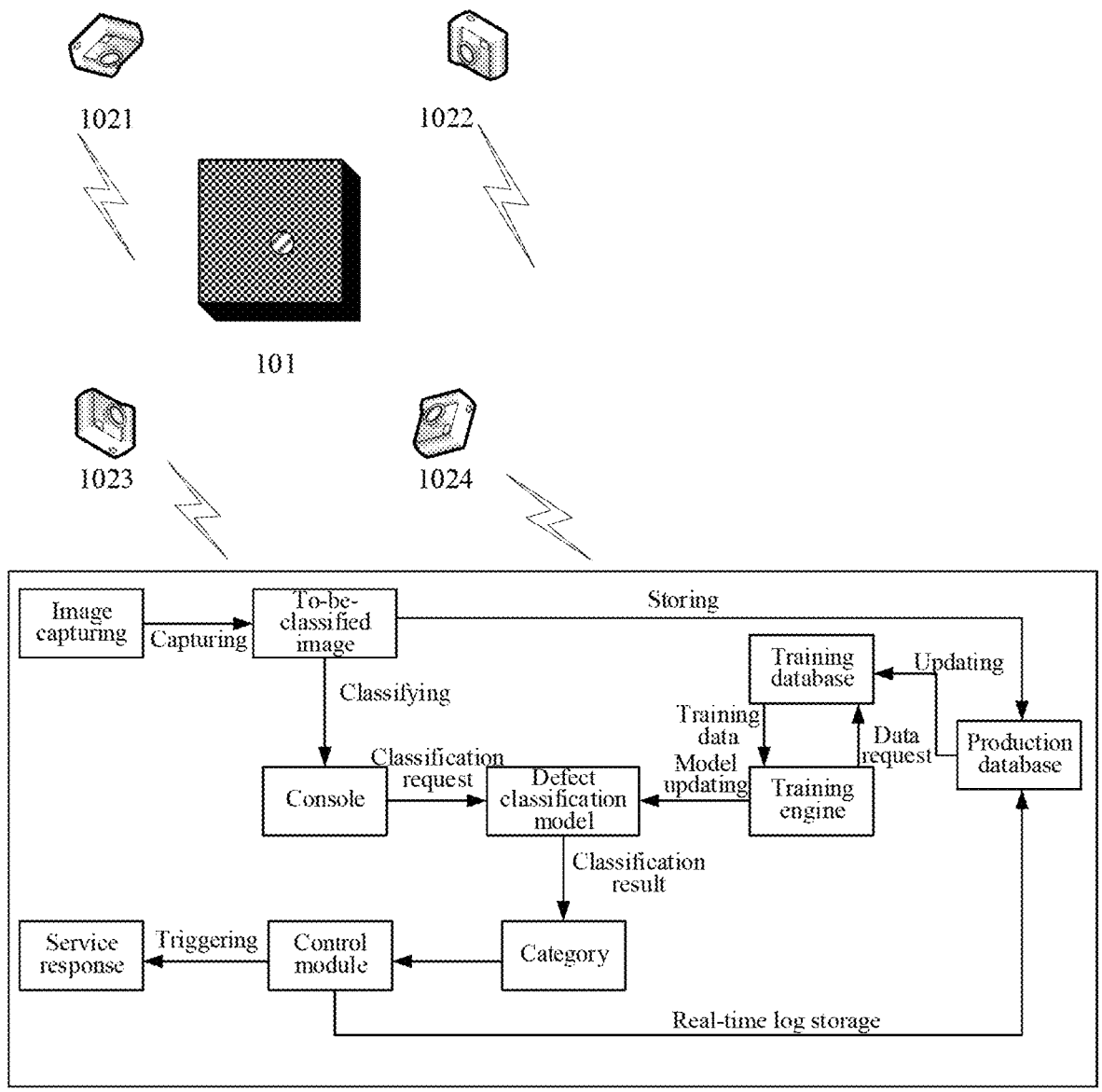
FIG. 1 is an architectural diagram of an example system in which some embodiments of the present disclosure may be implemented.

FIG. 1 shows an example system architecture 100 in which a method for outputting information or an apparatus for outputting information may be implemented.

As shown in FIG. 1, the system architecture 100 may include a to-be-inspected object 101, cameras 1021, 1022, 1023, and 1024, and a server 103. The network serves as a medium providing a communication link between the cameras 1021, 1022, 1023, and 1024, and the server 103. The network may include various types of connections, such as wired or wireless communication links, or optical cables.

The to-be-inspected object 101 may be a product on a production line to have surface inspection, especially a wooden product, e.g., wooden toys. Limited by employed wood, surface of these toys may have some defects caused by the wood, such as a wormhole, a crack, a notch, or a scab. Thus, surface quality inspection on the wooden toys is required.

The server 103 may include main modules such as an image capturing system, a console, a defect classification model, a training engine, a control module, a training database, a production database, and a service response system.

The image capturing system captures a plurality of images for subsequent processing by adjusting angle, light, filter, lens, or focus of a high-precision image capturing camera.

The console converts the images generated in real time by the image capturing system on the production line into classification requests, and transmits an inspection request to the defect classification model. The defect classification model has been trained by the training engine. After preset preprocessing on the image data in the received monitoring request, the defect classification model performs classification computation, gives a prediction result representing a defect category, and transmits the result to the control module. The control module is designed to be combined with a service scenario, and can make a response complying with scenario requirements of a production environment to the prediction result given by the model, such as giving an alarm, storing a log, or controlling a robot arm. The control module will store the prediction result and a responsive processing behavior into the production database as online production logs. The core of the system-defect classification model is obtained by training via the training engine based on historical annotated data.

The defect classification model adopts a deep convolutional neural network (Deep CNNs). An original image on the production line is took as an input of the model, and a tag representing a defect category, e.g., 0 to n representing n+1 defect categories, is took as an output of the model. A network structure mainly includes a convolutional layer, a pooling layer, a fully connected layer, and the like. In a convolution operation, scan convolution is performed on the original image or a feature map by using a convolution kernel with different weights, to extract features of various meanings therefrom and output the features to the feature map. In a pooling operation, dimension reduction is performed on the feature map, and main features of the feature map in maintained. Such a deep neural network model having the convolution and pooling operation may have very high robustness for deformation, fuzziness, illumination change, and the like of photos on the production line, and have higher generalizability for a classification task. For different production scenarios and data features, deep neural network models with different depths, different numbers of neurons, and different convolution and pooling organization manners may be designed, and then the models are trained by forward signal propagation and error back propagation based on annotated historical data. When an error value between the model output and the tag is less than a preset threshold complying with a service requirement, training is stopped.

For each model which completes the training, the model may be put on line in small flow, to replace an old model that is running online gradually, to achieve the purpose of generalizing the model with the dynamical expansion of business.

It should be noted that the method for outputting information provided in the embodiments of the present disclosure is generally executed by the server 103. Accordingly, the apparatus for outputting information is generally provided in the server 103.

It should be understood that the numbers of to-be-inspected objects, cameras, or servers in FIG. 1 are merely illustrative. Any number of to-be-inspected objects, cameras, or servers may be provided based on actual requirements.

Figure 2:
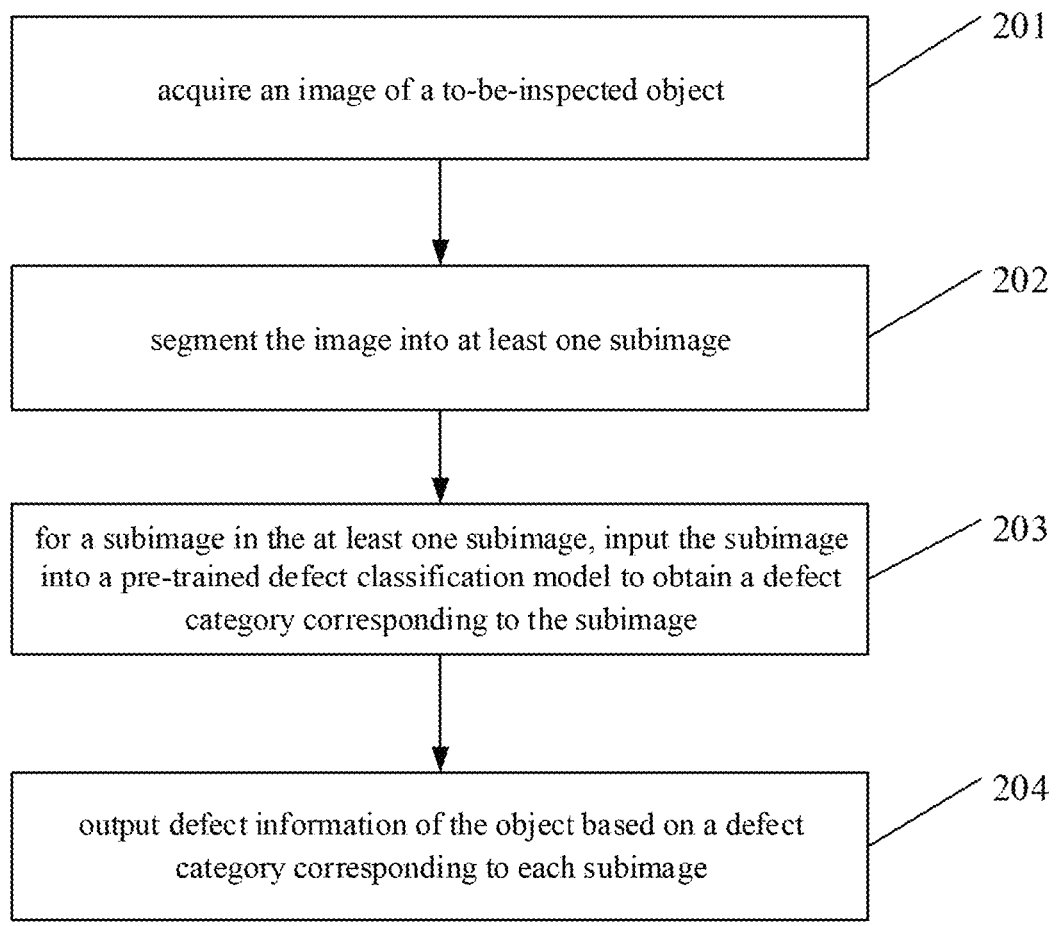
FIG. 2 is a flowchart of a method for outputting information according to an embodiment of the present disclosure.

Further referring to FIG. 2, a process 200 of a method for outputting information according to an embodiment of the present disclosure is shown. The method for outputting information includes:

Step 201: acquiring an image of a to-be-inspected object.

In the present embodiment, an executing body (e.g., the server shown in FIG. 1) of the method for outputting information may acquire, through wired connection or wireless connection, an image from a camera photographing the to-be-inspected object. The image captured by the camera may be preprocessed, to obtain the image of the to-be-inspected object after removing a background image. For example, a position of the object is detected by an edge detection algorithm, to crop out the image of the to-be-inspected object from the image captured by the camera. Images of the object in different angles may be acquired by controlling a camera adjusting angle, or acquired by cameras at different positions. Alternatively, at least one image of the to-be-inspected object may be further acquired by adjusting at least one of the following parameters of the camera: angle, light, filter, lens, or focus. For example, an image captured by turning on a flash lamp and an image captured without turning on the flash lamp may be acquired.

Step 202: segmenting the image into at least one subimage.

In the present embodiment, the image of the to-be-inspected object is segmented into at least one subimage. The subimages may be re-spliced to obtain the image of the to-be-inspected object. There may be an overlapping area between the subimages. If a plurality of images is acquired in step 201, then each of the images may be segmented. The image may be segmented into subimages of a given size. The image may also be segmented at different precisions based on characteristics of the object. For example, an image that is likely to have a defective edge may be segmented into subimages in a lower granularity.

Step 203: for a subimage in the at least one subimage, inputting the subimage into a pre-trained defect classification model to obtain a defect category corresponding to the subimage.

In the present embodiment, each subimage obtained by segmenting the image in step 202 is inputted into the pre-trained defect classification model. The defect classification model may determine whether the image has a defect and a category of the defect based on the inputted subimage. If the object is wooden, then the defect category may include at least one of the following: a wormhole, a crack, a notch, or a scab. No defect is also one of the defect categories.

As an example, the above-described defect classification model may include a feature extraction portion and a corresponding relationship table. The feature extraction portion may be configured to extract a feature from the image of the to-be-inspected object to generate an eigenvector. For example, the feature extraction portion may be a convolutional neural network, a deep neural network, or the like. The corresponding relationship table may be pre-established by skilled persons based on statistics of a large number of eigenvectors and a large amount of defect information, and stores a plurality of corresponding relationships between the eigenvectors and the defect information. Thus, the defect classification model may first extract the feature of the image of the to-be-inspected object using the feature extraction portion, thereby generating a target eigenvector. Then, the target eigenvector is compared with a plurality of eigenvectors in the corresponding relationship table successively, and if an eigenvector in the corresponding relationship table is identical or similar to the target eigenvector, then defect information corresponding to the eigenvector in the corresponding relationship table is used as defect information indicated by the image of the object.

Step 204: outputting defect information of the object based on a defect category corresponding to each subimage.

In the present embodiment, after step 203 is performed, at least one defect category may be obtained for each subimage. The defect information of the object may be obtained after analyzing a defect category combination corresponding to each subimage. The defect information may include the defect category, and may further include the number of defects. A defect of one category arising on one subimage may be counted as one. The number of subimages having a defect of a given category is statisticized for use as the number of defects of the given category. In order to more accurately determine the number of defects, the image may be re-segmented, and then the defect category is determined by the defect classification model. In particular, in the case where adjacent subimages obtained from last segmenting have an identical defect, the subimages may be combined together during re-segmenting.

Here, the output may be outputted to a displayer connected to a server, or a staff may be prompted of a defective product by voice. Alternatively, defect information may be directly transmitted to an apparatus for filtering defective products, such as a robot arm. The robot arm can pick out defective objects, or even put the defective objects into different recycling areas based on the defect category.

The method provided in the above embodiments of the present disclosure segments an image of a to-be-inspected object, and inputs obtained subimages into a pre-trained defect classification model, to obtain defect information, thereby improving the efficiency and accuracy of surface quality inspection of the object, facilitating re-utilization and mining of the defect information, improving the product quality while reducing the production costs.

Figure 3:
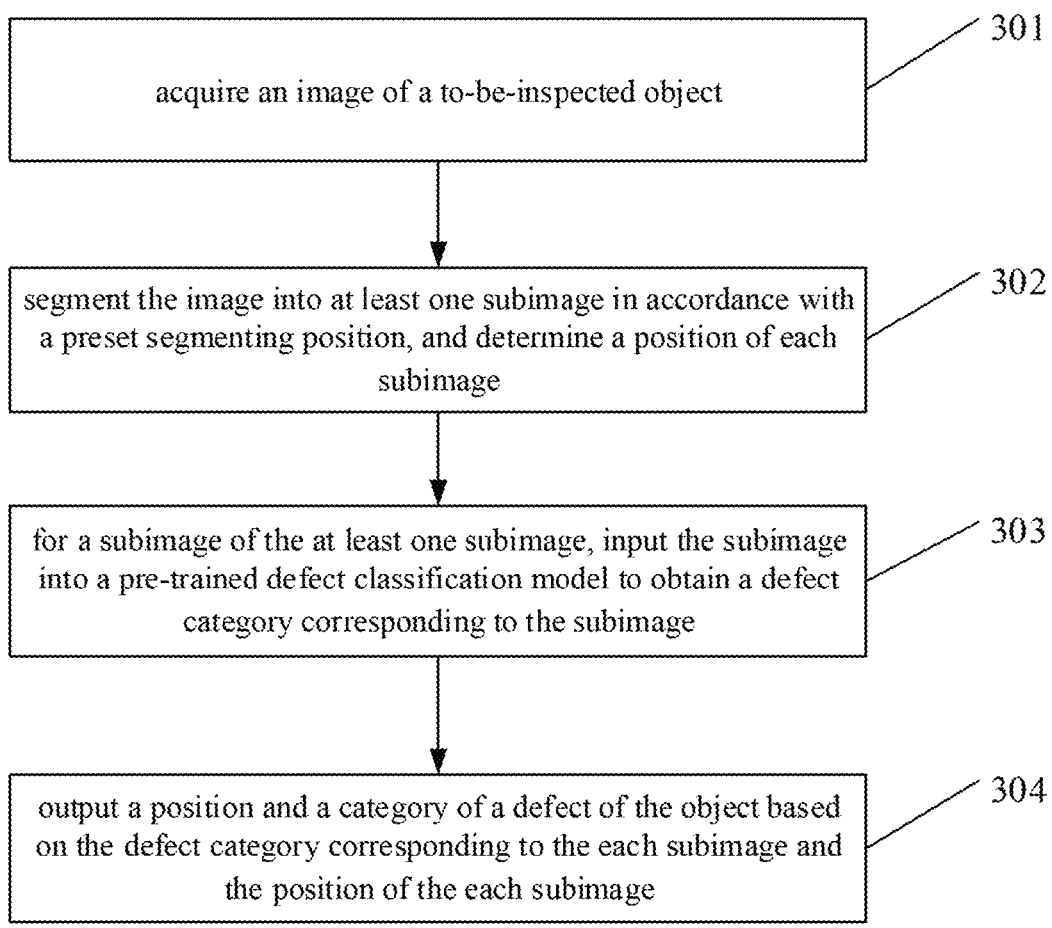
FIG. 3 is a flowchart of the method for outputting information according to another embodiment of the disclosure.

Further referring to FIG. 3, a process 300 of the method for outputting information according to another embodiment of the disclosure is shown. The process 300 of the method for outputting information includes:

Step 301: acquiring an image of a to-be-inspected object.

Step 301 is basically identical to step 201. Therefore, the description will not be repeated.

Step 302: segmenting the image into at least one subimage in accordance with a preset segmenting position, and determining a position of each subimage.

In the present embodiment, the segmenting position may be designed based on product features. For example, for an object with an easily damaged edge, an edge image is obtained by segmenting in a lower granularity. Positions in the original image of all subimages obtained from segmenting shall be recorded.

Step 303: for a subimage in the at least one subimage, inputting the subimage into a pre-trained defect classification model to obtain a defect category corresponding to the subimage.

Step 303 is basically identical to step 203. Therefore, the description will not be repeated.

Step 304: outputting a position and a category of a defect of the object based on the defect category corresponding to the each subimage and the position of the each subimage.

In the present embodiment, the method of determining the defect category in step 304 is basically identical to step 204. Therefore, the description will not be repeated. In addition, based on the position of each subimage obtained in step 303, a category of a defect identified by the model may be corresponded to a position of the defect in the original image. For example, it may be identified that there is a wormhole at 1 cm from the top and 0.5 cm from the left edge.

As can be seen from FIG. 3, compared with the corresponding embodiments of FIG. 2, the process 300 of the method for outputting information in the present embodiment highlights determining positions of defects in a product. Therefore, the solution described in the present embodiment can facilitate positioning defects, and provide corresponding statistical data of the defects, such that the producers can analyze the causes based on the statistical data of the defects, and improve the production technology.

Figure 4:
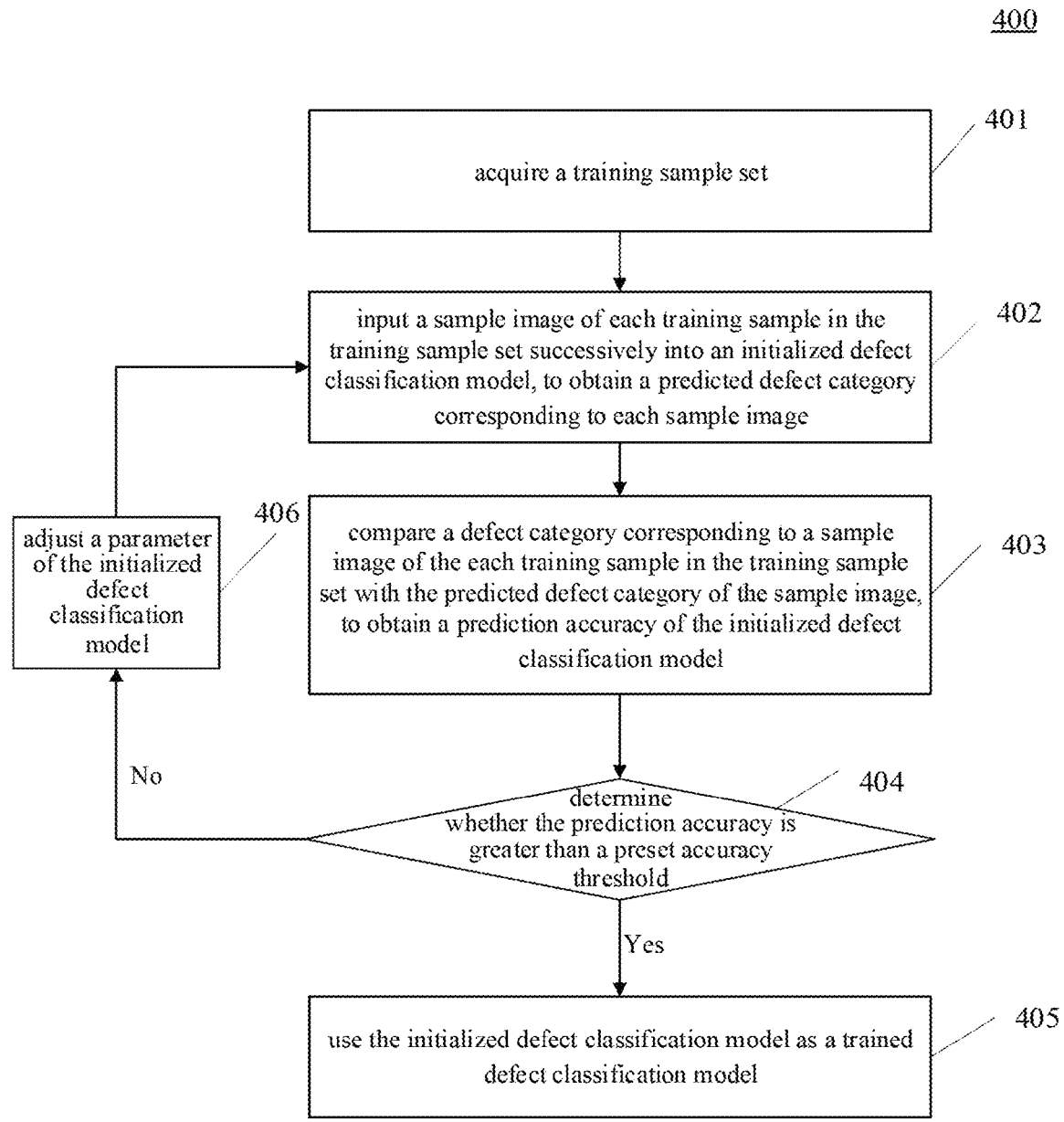
FIG. 4 is a flowchart of a method for training a defect classification model according to an embodiment of the present disclosure.

Further referring to FIG. 4, a process 400 of a method for training a defect classification model according to an embodiment of the present disclosure is shown. The process 400 of the method for training the defect classification model includes:

Step 401: acquiring a training sample set.

In the present embodiment, an electronic device (e.g., the server shown in FIG. 1) on which the method for training the defect classification model runs may acquire a training sample set, a training sample including a sample image of an object or a to-be-inspected object and a defect category corresponding to the sample image. The defect category of the training sample may be manually annotated.

Step 402: inputting a sample image of each training sample in the training sample set successively into an initialized defect classification model, to obtain a predicted defect category corresponding to each sample image.

In the present embodiment, based on the sample image of the object or the to-be-inspected object acquired in step 401, the electronic device may input the sample image of each training sample in the training sample set successively into the initialized defect classification model, thereby obtaining the predicted defect category corresponding to each sample image. Here, the electronic device may input each sample image at an input side of the initialized defect classification model, process the sample image successively based on a parameter of each layer in the initialized defect classification model, and output information from an output side of the initialized defect classification model. The information outputted from the output side is the predicted defect category corresponding to the sample image. The initialized defect classification model may be an untrained defect classification model or incompletely trained defect classification model, each layer of which is provided with an initialized parameter. The initialized parameter can be continuously adjusted in a process of training the defect classification model. The initialized defect classification model may use a deep convolutional neural network, such as VGG, or resnet.

Step 403: comparing a defect category corresponding to a sample image of the each training sample in the training sample set with the predicted defect category of the sample image, to obtain a prediction accuracy of the initialized defect classification model.

In the present embodiment, based on the predicted defect category of the sample image obtained in step 402, the electronic device may compare the defect category corresponding to a sample image of the training sample with the predicted defect category of the sample image, thereby obtaining the prediction accuracy of the initialized defect classification model. Specifically, if a defect category corresponding to a sample image of a training sample is identical or similar to a predicted defect category of the sample image, then the initialized defect classification model provides a correct prediction; and if the defect category corresponding to a sample image of the training sample is different from or unsimilar to the predicted defect category of the sample image, then the initialized defect classification model provides an incorrect prediction. Here, the electronic device may calculate a ratio of the number of sample images with correct predictions to the total number of samples, and use the ratio as the prediction accuracy of the initialized defect classification model.

Step 404: determining whether the prediction accuracy is greater than a preset accuracy threshold.

In the present embodiment, based on the prediction accuracy of the initialized defect classification model obtained in step 403, the electronic device may compare the prediction accuracy of the initialized defect classification model with a preset accuracy threshold, and execute step 405 if the prediction accuracy of the initialized defect classification model is greater than the preset accuracy threshold. If the prediction accuracy of the initialized defect classification model is less than or equal to the preset accuracy threshold, then step 406 is executed.

Step 405: using the initialized defect classification model as a trained defect classification model.

In the present embodiment, in the case where the prediction accuracy of the initialized defect classification model is greater than the preset accuracy threshold, it indicates that the training the defect classification model is completed. In this case, the electronic device may use the initialized defect classification model as the trained defect classification model.

Step 406: adjusting a parameter of the initialized defect classification model.

In the present embodiment, in the case where the prediction accuracy of the initialized defect classification model is less than or equal to the preset accuracy threshold, the electronic device may adjust a parameter of the initialized defect classification model, and return to execute step 402, until obtaining a defect classification model capable of characterizing a corresponding relationship between the sample image of the object or the to-be-inspected object and the defect category corresponding to the image sample by training.

Figure 5:
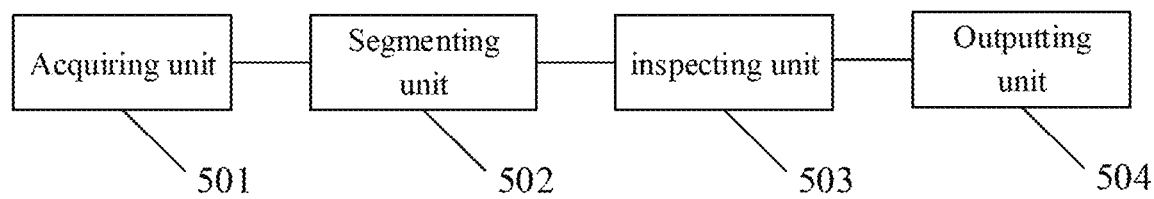
FIG. 5 is a schematic structural diagram of an apparatus for outputting information according to an embodiment of the present disclosure.

Further referring to FIG. 5, as an implementation of the method shown in the above figures, some embodiments of the present disclosure provides an embodiment of an apparatus for outputting information. The embodiments of the apparatus corresponds to the embodiments of the method shown in FIG. 2. The apparatus may be specifically applied to various electronic devices.

As shown in FIG. 5, the apparatus 500 for outputting information of the embodiment includes: an acquiring unit 501, a segmenting unit 502, an inspecting unit 503, and an outputting unit 504. The acquiring unit 501 is configured to acquire an image of a to-be-inspected object; the segmenting unit 502 is configured to segment the image into at least one subimage; the inspecting unit 503 is configured to input, for a subimage in the at least one subimage, the subimage into a pre-trained defect classification model to obtain a defect category corresponding to the subimage; and the outputting unit 504 is configured to output defect information of the object based on a defect category corresponding to each subimage.

Step 201, step 202, step 203, and step 204 in the corresponding embodiment of FIG. 2 may be referred to for specific processing of the acquiring unit 501, the segmenting unit 502, the inspecting unit 503, and the outputting unit 504 of the apparatus 500 for outputting information in the present embodiment.

In some alternative implementations of the present embodiment, the acquiring unit 501 is further configured to: acquire at least one image of the to-be-inspected object based on at least one of following parameters of a camera: angle, light, filter, lens, or focus.

In some alternative implementations of the present embodiment, the segmenting unit 502 is further configured to: segment the image into at least one subimage in accordance with a preset segmenting position, and determine a position of each subimage.

In some alternative implementations of the present embodiment, the outputting unit 504 is further configured to: output a position and a category of a defect of the object based on the defect category corresponding to each subimage and the position of each subimage.

In some alternative implementations of the present embodiment, the object is a wooden object, and the defect category includes at least one of following items: a wormhole, a crack, a notch, or a scab.

In some alternative implementations of the present embodiment, the apparatus 500 further includes a training unit (not shown in the figure) configured to: acquire a training sample set, a training sample including a sample image of an object or a to-be-inspected object and a defect category corresponding to the sample image; and obtain the defect classification model through training, with the sample image of the training sample in the training sample set as an input and the defect category corresponding to the inputted sample image as an output.

In some alternative implementations of the present embodiment, the defect classification model adopts a deep convolutional neural network, including: a convolutional layer, a pooling layer, and a fully connected layer.

Figure 6:
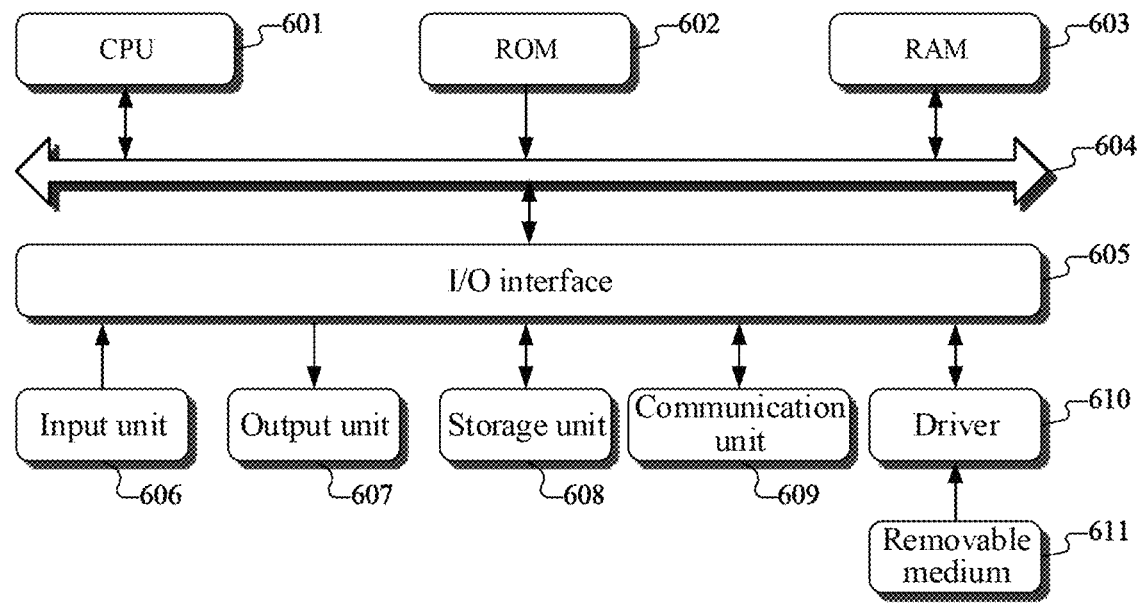
FIG. 6 is a schematic structural diagram of a computer system adapted to implement an electronic device of the embodiments of the present disclosure.

Referring to FIG. 6 below, a structural schematic diagram of an electronic device (e.g., the server in FIG. 1) 600 adapted to implement some embodiments of the present disclosure is shown. The server shown in FIG. 6 is merely an example, and should not limit the functions and scope of use of the embodiments of the present disclosure.

As shown in FIG. 6, the electronic device 600 may include a processing unit (e.g., a central processing unit, or a graphics processor) 601, which may execute various appropriate actions and processes in accordance with a program stored in a read only memory (ROM) 602 or a program loaded into a random access memory (RAM) 603 from a storage unit 608. The RAM 603 further stores various programs and data required by operations of the electronic device 600. The processing unit 601, the ROM 602 and the RAM 603 are connected to each other through a bus 604. An input/output (I/O) interface 605 is also connected to the bus 604.

In general, the following units may be connected to the I/O interface 605: an input unit 606 including a touch screen, a touch pad, a keyboard, a mouse, a camera, a microphone, an accelerometer, a gyroscope, or the like; an output unit 607 including a liquid crystal display device (LCD), a speaker, a vibrator, or the like; a storage unit 608 including a magnetic tape, a hard disk, or the like; and a communication unit 609. The communication unit 609 may allow the electronic device 600 to exchange data with other devices through wireless or wired communication. While FIG. 6 shows the electronic device 600 having various units, it should be understood that it is not necessary to implement or provide all of the units shown in the figure. More or fewer units may be alternatively implemented or provided. Each block shown in FIG. 6 may represent a unit, or represent a plurality of units as required.

In particular, according to the embodiments of the present disclosure, the process described above with reference to the flow chart may be implemented in a computer software program. For example, an embodiment of the present disclosure includes a computer program product, which includes a computer program that is tangibly embedded in a computer readable medium. The computer program includes program codes for executing the method illustrated in the flow chart. In such an embodiment, the computer program may be downloaded and installed from a network via the communication unit 609, or be installed from the storage unit 608, or be installed from the ROM 602. The computer program, when executed by the processing unit 601, implements the functions as defined by the method of the embodiments of the present disclosure. It should be noted that the computer readable medium of the embodiment of the present disclosure may be a computer readable signal medium or a computer readable storage medium, or any combination of the above two. An example of the computer readable storage medium may include, but is not limited to: electric, magnetic, optical, electromagnetic, infrared, or semiconductor systems, apparatuses, elements, or a combination of any of the above. A more specific example of the computer readable storage medium may include, but is not limited to: an electrical connection with one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination of the above. In the embodiments of the present disclosure, the computer readable storage medium may be any tangible medium containing or storing programs which may be used by, or used in combination with, a command execution system, apparatus or element. In the embodiments of the present disclosure, the computer readable signal medium may include data signal in the base band or propagating as parts of a carrier wave, in which computer readable program codes are carried. The propagating data signal may take various forms, including but not limited to an electromagnetic signal, an optical signal, or any suitable combination of the above. The computer readable signal medium may further be any computer readable medium except for the computer readable storage medium. The computer readable signal medium is capable of transmitting, propagating or transferring programs for use by, or used in combination with, a command execution system, apparatus or element. The program codes contained on the computer readable medium may be transmitted with any suitable medium, including but not limited to: wire, an optical cable, a RF (radio frequency) medium etc., or any suitable combination of the above.

The computer readable medium may be included in the above electronic device; or a stand-alone computer readable medium without being assembled into the electronic device. The computer readable medium carries one or more programs. The one or more programs, when executed by the electronic device, cause the electronic device to: acquire an image of a to-be-inspected object; segment the image into at least one subimage; for a subimage in the at least one subimage, input the subimage into a pre-trained defect classification model to obtain a defect category corresponding to the subimage; and output defect information of the object based on a defect category corresponding to each subimage.

A computer program code for executing operations in the embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In a circumstance involving a remote computer, the remote computer may be connected to a user's computer through any network, including local area network (LAN) or wide area network (WAN), or be connected to an external computer (for example, connected through the Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logical functions. It should be further noted that, in some alternative implementations, the functions denoted by the blocks may also occur in a sequence different from the sequences shown in the figures. For example, any two blocks presented in succession may be executed substantially in parallel, or they may sometimes be executed in a reverse sequence, depending on the functions involved. It should be further noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The units involved in the embodiments of the present disclosure may be implemented by software or hardware. The described units may also be provided in a processor, for example, described as: a processor including an acquiring unit, a segmenting unit, an inspecting unit, and an outputting unit. The names of the units do not constitute a limitation to such units themselves in some cases. For example, the acquiring unit may be further described as "a unit configured to acquire an image of a to-be-inspected object."

The above description only provides an explanation of the preferred embodiments of the present disclosure and the employed technical principles. It should be appreciated by those skilled in the art that the inventive scope of the present disclosure is not limited to the technical solutions formed by the particular combinations of the above-described technical features. The inventive scope should also cover other technical solutions formed by any combination of the above-described technical features or equivalent features thereof without departing from the inventive concept of the present disclosure, for example, technical solutions formed by interchanging the above-described features with, but not limited to, technical features with similar functions disclosed in the present disclosure.

What is claimed is:

1. A method for outputting information, comprising:
   acquiring at least one image of a to-be-inspected object by adjusting at least one of following parameters of a camera: filter, lens, or focus;
   segmenting each image in the at least one image into at least one subimage;
   for a subimage in the at least one subimage, inputting the subimage into a pre-trained defect classification model to obtain a defect category corresponding to the subimage; and
   outputting defect information of the to-be-inspected object based on the defect category corresponding to each subimage in the at least one subimage, wherein the defect information of the to-be-inspected object further includes a number of defects of each defect category;
   counting a number of subimages containing a defect of a given defect category; and
   using the number of subimages containing the defect of the given defect category as the number of defects of the given defect category.

2. The method according to claim 1, wherein the method further comprises acquiring the at least one image of the to-be-inspected object by adjusting at least one of: an angle of the camera or light of the camera.

3. The method according to claim 1, wherein the segmenting each image in the at least one image into the at least one subimage comprises:
   segmenting each image into the at least one subimage in accordance with a preset segmenting position, and determining a position of each subimage in the at least one subimage.

4. The method according to claim 3, wherein the outputting the defect information of the to-be-inspected object based on the defect category corresponding to each subimage in the at least one subimage comprises:
   outputting a position of the to-be-inspected object and the defect category of the to-be-inspected object based on the defect category corresponding to each subimage and the position of each subimage.

5. The method according to claim 1, wherein the to-be-inspected object is a wooden object, and the defect category comprises at least one of:
   a wormhole, a notch, or a scab.

6. The method according to claim 1, wherein the pre-trained defect classification model is obtained by following training:
   acquiring a training sample set, a training sample in the training sample set comprising a sample image of an object and the defect category corresponding to the sample image; and
   obtaining the pre-trained defect classification model through training, with the sample image of the training sample in the training sample set as an input and the defect category corresponding to the sample image as an output.

7. The method according to claim 6, wherein the pre-trained defect classification model adopts a deep convolutional neural network, comprising: a convolutional layer, a pooling layer, and a fully connected layer.

8. The method according to claim 1, wherein the counting the number of subimages containing the defect of the given defect category comprises: re-segmenting each image, and obtaining the number of defects of each defect category by using the pre-trained defect classification model based on re-segmented subimages, wherein the re-segmenting each image comprises combining adjacent subimages being obtained from last segmenting and having an identical defect.

9. An apparatus for outputting information, comprising:
at least one processor; and
a memory storing instructions, wherein the instructions when executed by the at least one processor, cause the at least one processor to perform operations, the operations comprising:
    acquiring at least one image of a to-be-inspected object by adjusting at least one of following parameters of a camera: filter, lens, or focus;
    segmenting each image in the at least one image into at least one subimage;
    for a subimage in the at least one subimage, inputting the subimage into a pre-trained defect classification model to obtain a defect category corresponding to the subimage; and
    outputting defect information of the to-be-inspected object based on the defect category corresponding to each subimage in the at least one subimage, wherein the defect information of the to-be-inspected object further includes a number of defects of each defect category;
    counting a number of subimages containing a defect of a given defect category; and
    using the number of subimages containing the defect of the given defect category as the number of defects of the given defect category.

10. The apparatus according to claim 9, wherein the operations further comprise acquiring the at least one image of the to-be-inspected object by adjusting at least one of: an angle of the camera or light of the camera.

11. The apparatus according to claim 9, wherein the segmenting each image in the at least one image into the at least one subimage comprises:
    segmenting each image into the at least one subimage in accordance with a preset segmenting position, and determining a position of each subimage in the at least one subimage.

12. The apparatus according to claim 11, wherein the outputting the defect information of the to-be-inspected object based on the defect category corresponding to each subimage in the at least one subimage comprises:
    outputting a position of the to-be-inspected object and the defect category of the to-be-inspected object based on the defect category corresponding to each subimage and the position of each subimage.

13. The apparatus according to claim 9, wherein the to-be-inspected object is a wooden object, and the defect category comprises at least one of:
    a wormhole, a notch, or a scab.

14. The apparatus according to claim 9, wherein the pre-trained defect classification model is obtained by following training:
    acquiring a training sample set, in the training sample set comprising a sample image of an object and the defect category corresponding to the sample image; and
    obtaining the pre-trained defect classification model through training, with the sample image of the training sample in the training sample set as an input and the defect category corresponding to the sample image as an output.

15. The apparatus according to claim 14, wherein the pre-trained defect classification model adopts a deep convolutional neural network, comprising: a convolutional layer, a pooling layer, and a fully connected layer.

16. A non-transitory computer readable medium, storing a computer program thereon, wherein the computer program, when executed by a processor, cause the processor to perform operations, the operations comprising:
    acquiring at least one image of a to-be-inspected object by adjusting at least one of following parameters of a camera: filter, lens, or focus;
    segmenting each image in the at least one image into at least one subimage;
    for a subimage in the at least one subimage, inputting the subimage into a pre-trained defect classification model to obtain a defect category corresponding to the subimage; and
    outputting defect information of the to-be-inspected object based on the defect category corresponding to each subimage in the at least one subimage, wherein the defect information of the to-be-inspected object further includes a number of defects of each defect category;
    counting a number of subimages containing a defect of a given defect category; and
    using the number of subimages containing the defect of the given defect category as the number of defects of the given defect category.

17. The non-transitory computer readable medium according to claim 16, wherein the operations further comprise acquiring the at least one image of the to-be-inspected object by adjusting at least one of: an angle of the camera or light of the camera.

18. The non-transitory computer readable medium according to claim 16, wherein the segmenting each image in the at least one image into the at least one subimage comprises:
    segmenting each image into the at least one subimage in accordance with a preset segmenting position, and determining a position of each subimage in the at least one subimage.

19. The non-transitory computer readable medium according to claim 18, wherein the outputting the defect information of the to-be-inspected object based on the defect category corresponding to each subimage in the at least one subimage comprises:
    outputting a position and the defect category of a defect of the to-be-inspected object based on the defect category corresponding to each subimage and the position of each subimage.

* * * * *